Nov. 27, 1928.

W. W. SLOANE

POWER SHOVEL

Filed July 12, 1926

Inventor
William W. Sloane
Clarence F. Poole
Attorney

Nov. 27, 1928.

W. W. SLOANE

POWER SHOVEL

Filed July 12, 1926

Inventor
W. W. Sloane
Clarence F. Poole
Attorney

Nov. 27, 1928.                                         1,692,872
W. W. SLOANE
POWER SHOVEL
Filed July 12, 1926         10 Sheets-Sheet 7

Inventor
W. W. Sloane
by Clarence F. Poole
Attorney

Nov. 27, 1928.

W. W. SLOANE

1,692,872

POWER SHOVEL

Filed July 12, 1926 10 Sheets-Sheet 8

Inventor
W. W. Sloane
Clarence F. Poole
Attorney

Patented Nov. 27, 1928.

1,692,872

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Application filed July 12, 1926. Serial No. 121,994.

This invention relates to power shovels for use in confined spaces such as in mines, although not limited to this use alone. Specifically, the invention relates to the longitudinally movable scoop carrying beam type of power shovel and has for its general object the provision of a structure whereby the length required for the longitudinal operation of the scoop carrying beam is relatively short, all with a view toward general all around convenience and efficiency, particularly where used in confined spaces.

Referring now to the drawings.

Like numerals refer to like parts throughout the several figures.

In the drawings 1 designates a base frame, which is carried on laterally spaced continuous tread mechanisms 2 of usual construction which are adapted for the propulsion of the shovel.

Mounted centrally on the base frame 1 is a vertically disposed cylinder 3 containing a piston 4, arranged so that the piston may be raised by fluid pressure in the cylinder to engage a fixer part, such as a roof, thus forming a holding jack for the machine while it is in operation.

Figure 2:
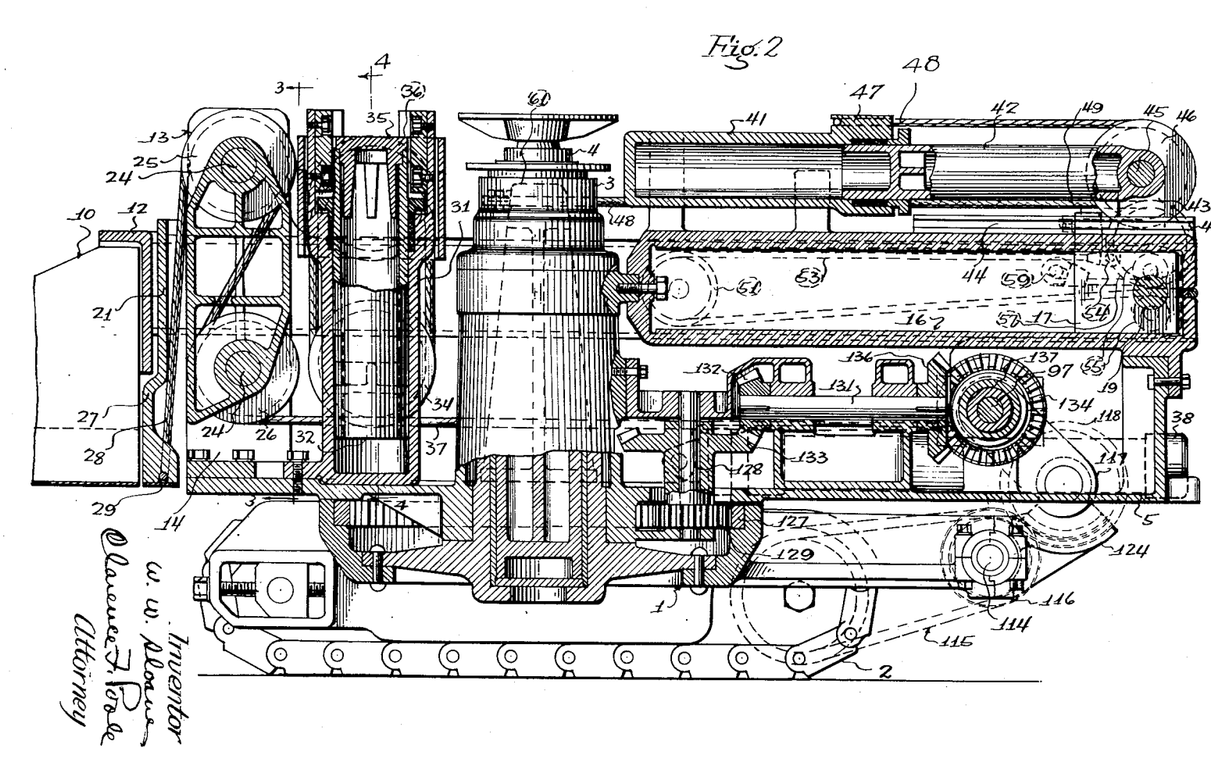
Figure 2 is a central longitudinal vertical section of the machine illustrated in Figure 1.

A turntable or rotatable frame 5 is carried by the base 1 for movement axially about the vertically disposed cylinder 3, as best shown in Figure 2, and this turntable carries the major portion of the operating mechanism.

An electric motor 6 and a fluid pressure pump 7 are mounted on the turntable and are disposed in horizontal longitudinal arrangement along one side thereof. A reduction gear transmission mechanism 8 operably connects the adjacent ends of the shafts of the motor and pump for the operation of the various mechanisms of the machine as hereinafter described. See Figure 1.

Figure 3:
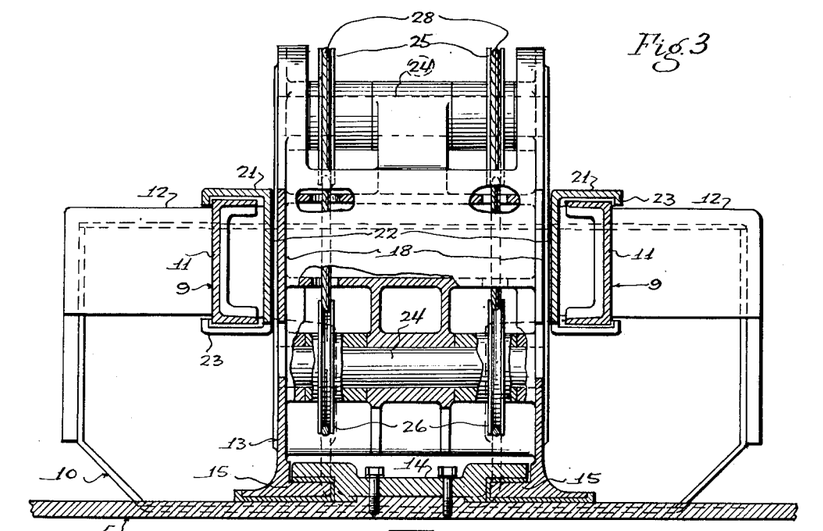
Figure 3 is an enlarged partial section on the line 3—3 of Figure 2 and with parts broken away.

A beam 9 carries a scoop 10 at its front end and comprises two laterally spaced inwardly facing parallel channel members 11 and a single cross tie structure 12 at the front ends of the channel members and forming the rear end of the scoop 10. See Figures 1 and 3. The beam 9 is carried with the turntable for operative movement, in central relation with the hereinbefore described vertical holding jack and with the channel members operating in paths on opposite sides of said jack, as follows. See Figures 1, 2, 3, 5 and 8. A support frame 13 is disposed horizontally and longitudinally of the beam 9 in central relation with the holding jack and is mounted for horizontal longitudinal movement on the turntable 5 in the following manner. The front end of this support frame is mounted for sliding movement on the floor of the turntable and in front of the jack by means of a bearing 14 in which are engaged for sliding movement bearing portions 15 at the bottom of the support frame and extending longitudinally of the forward portion thereof. An elevated horizontal bearing member 16, disposed at the rear of the jack, is secured with the turntable and extends longitudinally of the beam 9 in central relation with the beam and the jack, and mounted for movement in this bearing member is a bearing block 17. The support frame 13 extends rearwardly of the jack on both sides thereof, it being provided with a central vertical opening 18 therethrough extending longitudinally thereof to provide clearance for the jack, and a horizontal shaft 19 disposed transversely of the beam 9 is engaged in bores of said bearing block 17 and the rear ends of the portions of the support frame 13 disposed on respective sides of the opening 18 thereof. An elevating arm 21, provided with a central vertical opening 22 therethrough extending longitudinally thereof, has the rear ends of the portions thereof, formed by the opening 22, pivotally mounted on the shaft 19, and the elevating arm extends forwardly from the shaft 19 with these portions, formed by the opening 22, on opposite sides of the jack and outside of the support frame 13. Thus the elevating arm is carried with the support frame 13 for horizontal movement with respect to the turntable longitudinally of the beam 9 and for vertical pivotal movement with respect to the support frame on the axis of the shaft 19. The beam 9 is mounted for longitudinal movement on and longitudinally of the elevating arm 21 by means of the channel members 11 of the beam being slidably engaged in bearings 23 on respective sides of the elevating arm.

As so carried the beam 9 carrying the scoop 10 is movable vertically by reason of the pivotal mounting of the elevating arm 21 and longitudinally or horizontally by reason of the longitudinal movement of the beam with respect to the elevating arm and the horizontal longitudinal movement of the support frame 13 with respect to the turntable 5, the longitudinal movement of the beam together with the corresponding movement of the support frame permitting a relatively great longitudinal movement of the beam as compared with the length required for the longitudinal operation thereof, and the arrangement of the aforementioned openings of the support frame, elevating arm and beam providing for clearance of the aforementioned vertical holding jack.

Figure 14:
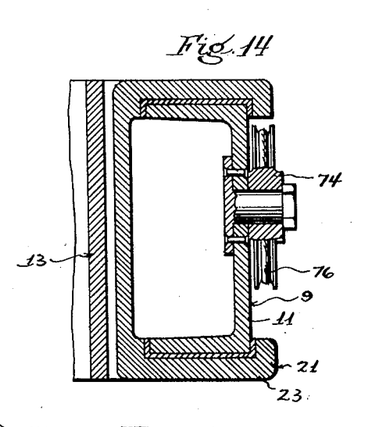
Figure 14 is an enlarged partial section on the line 14—14 of Figure 11.
Figure 15:
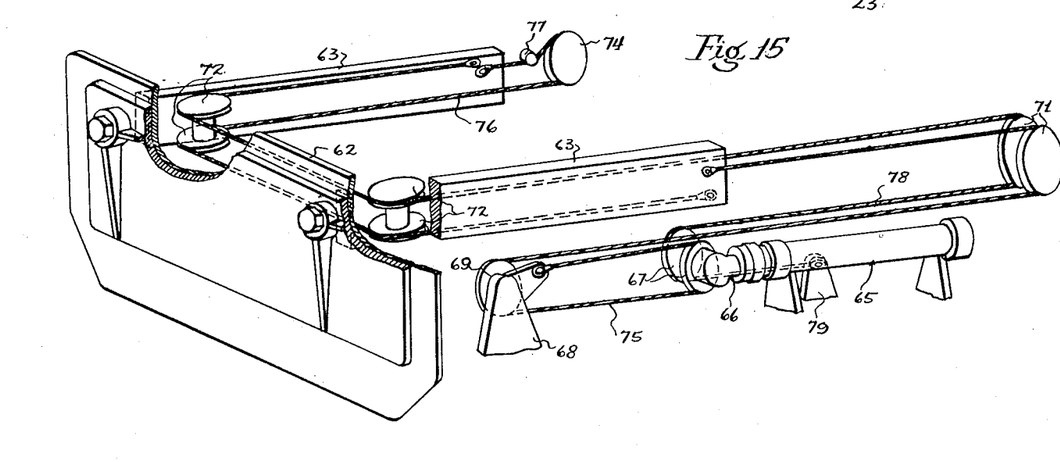
Figure 15 is an isometric diagram of the ejector and operating mechanism thereof, hereinafter described.
Figure 16:
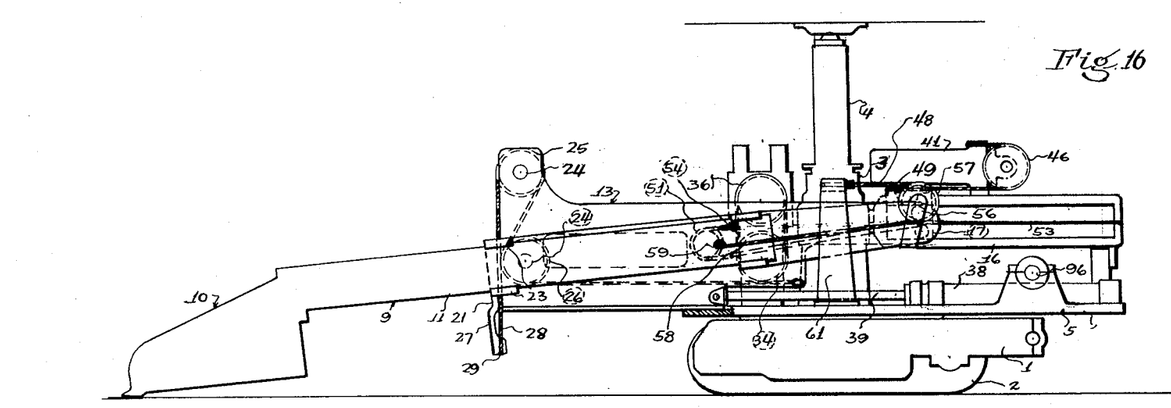
Figures 16 and 17 are diagrammatic side elevations of the machine showing parts thereof in different positions.
Figure 17:
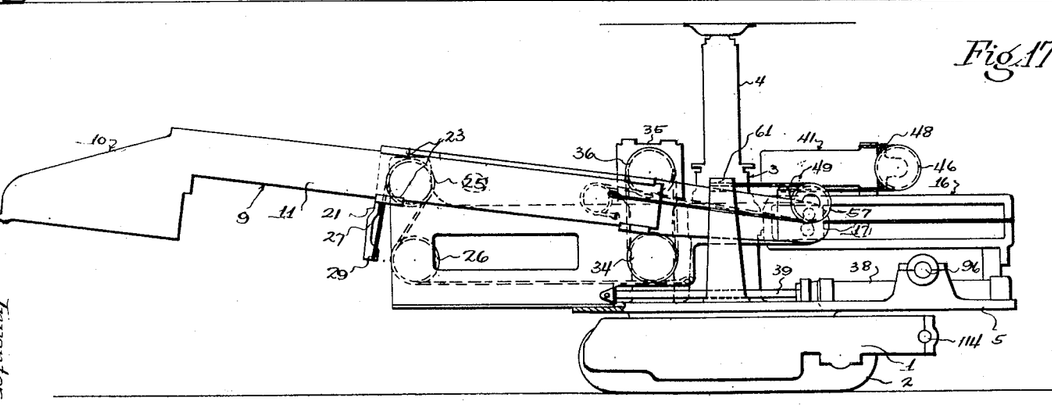

A portion of the vertical range of the beam 9 and scoop 10 is illustrated in Figures 14 and 15, and the longitudinal or radial range of the beam and scoop is illustrated in Figures 1, 2, 16 and 17, Figures 1 and 2 showing the beam and scoop at the inner end and Figures 16 and 17 showing them at the outer end of this movement.

The support frame 13 is provided at its front end with a pair of vertically spaced transversely disposed shafts 24 extending across the same and through bores therein. See Figures 1, 2 and 3. The upper shaft 24 is disposed at the top of the support frame 70 and two laterally spaced sheaves 25 are revolubly mounted thereon. The lower shaft 24 is disposed adjacent the bottom of the support frame and two laterally spaced sheaves 26 are revolubly mounted thereon in alinement with respective sheaves 25. The front end of the elevating arm 21 which extends about the front end of the support frame 13 is extended downwardly, as designated at 27 in Figure 2, and a cable 28 is engaged in a transverse groove 29 on the bottom of this extension. This cable extends from the sides of the groove 29 upwardly, and the extending portions of the cable are trained over respective sheaves 25, then in opposite relation under respective sheaves 26 and from thence rearwardly for operation for lifting or vertically positioning the elevating arm 21 in a manner now to be described.

Figure 4:
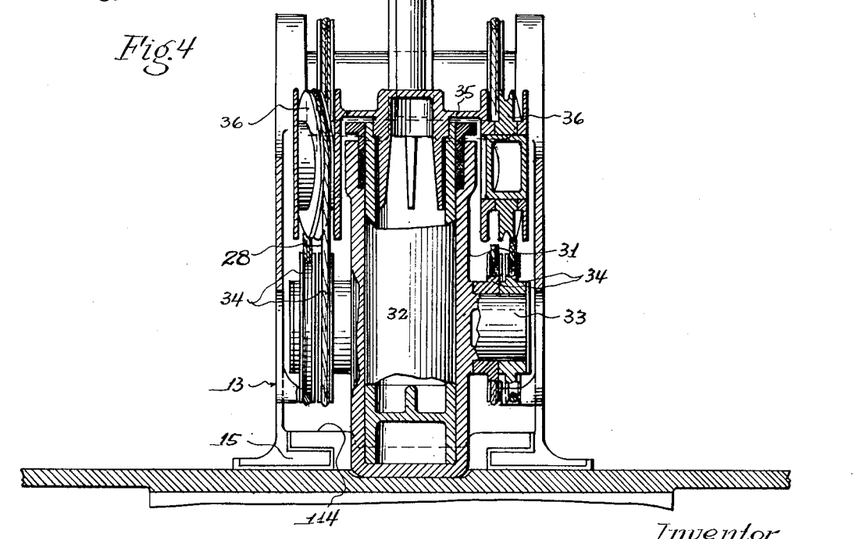
Figure 4 is an enlarged partial section on the line 4—4 of Figure 2.

Mounted on the turntable 5 immediately in front of the aforementioned holding jack and extending from the turntable upwardly through the opening 18 of the support frame 13 is a vertically disposed cylinder 31 containing a piston 32, arranged so that the piston may be raised by fluid pressure in this cylinder. See Figures 2 and 4. The cylinder 31 is provided adjacent the lower end thereof with a pair of coaxial laterally projecting studs 33 disposed on respective sides thereof, and mounted for independent rotation on respective studs are pairs of sheaves 34. Mounted on the upper end of the piston 32 is a carrying member 35 carrying at respective sides of the cylinder 31 two revoluble sheaves 36 which are disposed on horizontal axes and in planes at slight angles to the planes of the sheaves 34 so that the groove of each of the sheaves 36 alines with the groove of the inner of the respective pair of sheaves 34 at the rear thereof, and with the groove of the outer of the respective pair of sheaves 34 at the front thereof. See Figures 1, 2 and 4.

The two portions of the cable 28 as they extend rearwardly from respective sheaves 26 are trained under and upwardly about respective inner sheaves 34, then upwardly to the rear of respective sheaves 36 and about the same, then downwardly to the front of respective outer sheaves 34 and about the same, and finally rearwardly from respective outer sheaves 34 to adjacent the rear end of the support frame 13 where they are secured therewith as designated at 37. See Figures 1, 2, 4 and 16.

It will be observed that the sheaves 36 are operated vertically with the piston 32 of the lifting cylinder 31, and that as the sheaves 36 are moved upwardly they move away from the sheaves 34 and consequently increase the loops of the cable 28 formed by the sheaves 34 and 36. As a result of this actuation the cable 28 operating over the sheaves 25 and 26 effects upward movement of the elevating arm 21 and the beam 9 and scoop 10 carried therewith. Downward movement of the sheaves 36 from an upward position obviously effects decrease of said loop and a lowering of the elevating arm, the beam and the scoop. Thus introduction of fluid pressure into the lifting cylinder 31 effects upward movement of the beam and scoop and release of fluid pressure therein effects downward movement of the beam and scoop.

It will be observed that the sheaves 34 and 36 increase the movement of the piston 32 on the cable 28 so that the cylinder 31 and the piston 32 are relatively short as compared to the vertical movement of the elevating arm 21 at its front end.

It will be further observed that the sheaves 34 and 36 and related structure provide compensation for the horizontal movement of the support frame 13, so that, while the lift actuating means is carried on the turntable 5 and the lifting means is carried on the support frame 13 with obvious advantage, horizontal movement of the support frame 13 with respect to the turntable 5 has no effect with respect to altering the vertical position of the beam 9 and scoop 10, the sheaves 34 and 36 merely rolling on the cable 28 during such movement.

Radial or longitudinal movement at the scoop 10 by longitudinal movement of the beam 9 and the support frame 13 is effected in the following manner. See Figures 1, 2, 8, 9 and 10.

Disposed in parallelism with the direction of movement of the support frame 13 and on axes at respective sides of the holding jack and adjacent the floor of the turntable 5 and secured on the turntable is a pair of hydraulic cylinders 38, hereinafter referred to as the out cylinder. These cylinders are disposed rearwardly on the turntable and the plungers 39 thereof operate forwardly therefrom and are secured to the support frame 13 intermediate the length thereof and at the rear end of the bearings 15 of the support frame for operating the support frame forwardly on the turntable.

Disposed at the rear of the holding jack in central relation therewith and above said bearing member 16 and in parallelism with the movement of the support frame 13 is a relatively short hydraulic cylinder 41, hereinafter referred to as the in cylinder. The plunger 42 of this cylinder operates rearwardly therefrom and is provided adjacent its rear end with a downwardly projecting bearing 43 which is engaged for sliding movement in a bearing 44 disposed in parallelism with the cylinder 41 on top of said bearing 16 and secured thereon for the guidance of the rear end of the plunger 42.

The rear end of the plunger 42 is provided with a transverse shaft 45 on respective ends of which are rotatably mounted two sheaves 46. The rear end of the in cylinder 41 is provided on the top thereof with a transverse anchor formation 47 grooved at its front and sides. A cable 48 is engaged in the groove of the formation 47 and extends from the sides thereof rearwardly, and the extending portions of this cable are trained over respective sheaves 46 and from thence extend forwardly and are secured to the rear ends of respective side portions of the support frame 13, as designated at 49. Thus, as the plunger 42 is moved rearwardly by fluid pressure in the in cylinder 41, it operates through the sheaves 46 and cable 48 to move the support frame 13 rearwardly at twice the rate of movement of the plunger, the sheaves 46 and cable 48 as utilized constituting an increasing movement device.

Thus, the introduction of fluid pressure into the out cylinders 38 effects forward movement of the support frame 13 and the introduction of fluid pressure into the in cylinder 41 effects rearward movement of the support frame. The beam 9 and the scoop 10 are operated longitudinally of the beam in synchronism with and in a greater magnitude than corresponding movement of the support frame 13 in the following manner. See particularly Figures 1, 2, 9 and 10.

Mounted on the out sides of respective side portions of the elevating arm 21 intermediate the ends thereof and lying within the enclosure of respective channel members 11 of the beam 9 is a pair of revoluble sheaves 51 disposed on a transverse axis. The rear end of the bearing member 16 is extended laterally, as indicated at 52, so that the extremities of this extended portion aline with respective sheaves 51 longitudinally of the machine. The rear face of this extended portion 52 is grooved transversely and about the ends thereof, and a cable 53 is engaged in the groove of said portion 52 and extends from the extremities thereof forwardly, and the extending portions of this cable are trained over respective sheaves 51 and from thence extend rearwardly and are secured to the rear ends of respective channel members 11 of the beam 9, as indicated at 54. Opposing pairs of rollers 55 are mounted adjacent the rear ends of respective sides of the elevating arm 21 and the portions of the cable 53 extending from the portion 52 pass between respective pairs of these rollers for guiding the same. See Figures 8, 9 and 10.

The support frame 13 is provided at its rear end with brackets 56 extending laterally from respective side portions outwardly underneath the elevating arm 21 and the channel members 11 of the beam and then upwardly on the outside of respective channel members 11, and a pair of sheaves 57 are rotatably mounted on the upper ends of respective brackets 56 and are disposed on a transverse axis. Two cables 58 are trained over respective sheaves 57 and extend forwardly therefrom and have the ends thereof respectively secured to the rear ends of respective channel members 11 of the beam, as designated at 59, and to the upper ends of brackets 61 mounted on the turntable 5 on respective sides of the beam and beam carrying structure at the intermediate portion of the turntable.

Forward movement of the support frame 13, effected by the out cylinders 38, is transmitted to the beam 9 to effect forward movement of the beam at twice the rate of the movement of the support frame by means of the cable 53, secured with the turntable and beam, and the sheaves 51 operating in an obvious manner. And rearward movement of the support frame, effected by the in cylinder 41, is transmitted to the beam 9 to effect rearward movement of the beam at twice the rate of the movement of the support frame by means of the cables 58, secured with the turntable and beam, and the sheaves 57 operating in a likewise obvious manner. The cables 53 and 58 and the sheaves 51 and 57 operating as aforesaid constitute increasing movement means whereby longitudinal movement of the beam 9 and scoop 10 is effected in synchronism with and of greater magnitude than corresponding movement of the support frame 13.

Figure 11:
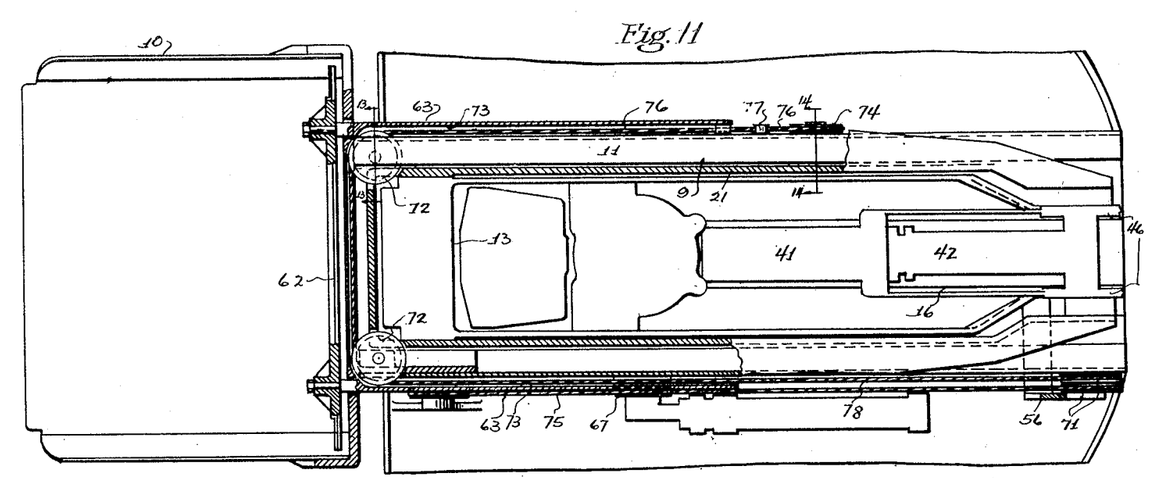
Figure 11 is a view similar to Figure 9 with different parts omitted, broken away and in section.
Figure 12:
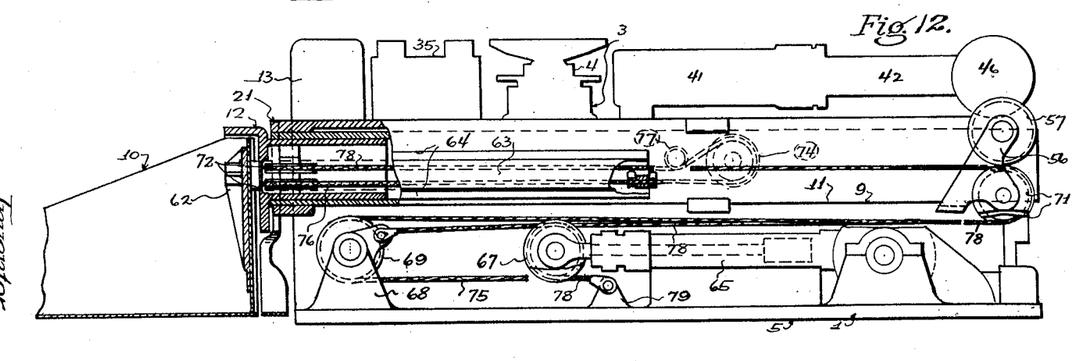
Figure 12 is a view similar to Figure 10 with different parts omitted, broken away and in section.
Figure 13:
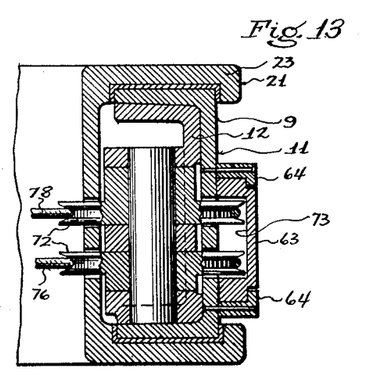
Figure 13 is an enlarged partial section on the line 13—13 of Figure 11.

The scope 10 is provided with an ejector 62 which is carried for movement longitudinally of the scoop on the front ends of bars 63 extending longitudinally of the beam 9 and mounted on the out sides of respective channel members 11, by means of bearings 64, for longitudinal sliding movement longitudinally of the beam. See Figures 11 and 13. The ejector 62 is operated in the following manner.

Mounted on the turntable 5 and extending longitudinally of the support frame 13 and disposed on the left hand side thereof is a double acting fluid pressure actuating device comprising a cylinder 65, of usual construction, the plunger 66 of which operates forwardly thereof and carries a pair of sheaves 67 on its front end. See Figures 11 to 15 inclusive. Disposed forwardly on the turntable 5 is a bracket 68 on which is mounted a revoluble sheave 69. Mounted on the left hand bracket 56 of the support frame 13 is another pair or revoluble sheaves 71. Mounted on the beam on vertical axes at the front ends of respective channel members 11 are pairs of revoluble sheaves 72, the elevating arm 21 and the beam structure being provided with suitable openings therefor and the bars 63 having their inner faces channeled longitudinally, as designated at 73 in Figures 11 and 13, for this purpose and for another purpose hereinafter appearing. A revoluble sheave 74 is mounted on the out side of the right hand channel member 11 of the beam at a point to the rear of the respective bar 63. A cable 75 has one end thereof secured to the bracket 68 and extends rearwardly therefrom and is trained over one of the sheaves 67. It then extends forwardly from the engaged sheave 67 to the sheave 69 and is trained thereover, from thence it extends rearwardly and is trained over one of the sheaves 71, and from thence it extends forwardly and has its other end secured to the rear end of the left hand bar 63. See particularly Figure 15. A cable 76 has one end thereof secured to the rear end of the left hand bar 63 and extends forwardly in the channel 73 thereof and is trained over one of the left hand sheaves 72. From thence this cable 76 extends transversely and is trained over one of the right hand sheaves 72, from thence it extends rearwardly and is trained over the sheave 74, and from thence it extends forwardly and has the other end thereof secured to the right hand bar 63, a guide roller 77 mounted on the right-hand channel member 11 engaging this last mentioned stretch of the cable 76 to properly position the same.

By means of this arrangement rearward movement of the plunger 66 operates through the cable 75, engaged as aforesaid to move the left hand bar 63 rearwardly, and this movement of the left hand bar 63 operates through the cable 76, engaged as aforesaid, to move the right hand bar 63 rearwardly in synchronism with the left hand bar 63. Thus the ejector 62 is moved rearwardly by the introduction of fluid pressure into the front end of the cylinder 65 to move the plunger 66 thereof rearwardly.

A cable 78 has one end thereof secured to a bracket 79 on the turntable and disposed to the rear of the front end of the cylinder 65. This cable 78 extends forwardly from the bracket 79 and is trained over the other sheave 67. From thence it extends rearwardly and is trained over the other sheave 71, from thence it extends forwardly through the channel 73 of the left hand bar 63 and is trained over the other of the left hand sheaves 72, from thence it extends transversely and is trained over the other of the right hand sheaves 72, and from thence it extends rearwardly through the channel 73 of the right hand bar 63 and has its other end secured to the rear end of the right hand bar 63.

By means of this arrangement forward movement of the plunger 66 operates through the cable 78, engaged as aforesaid, to move the right hand bar 63 forwardly, and this movement of the right hand bar 63 operates through the cable 76, engaged as aforesaid, to move the left hand bar 63 forwardly in synchronism with the right hand bar 63. Thus the ejector is moved forwardly by the introduction of fluid pressure into the rear end of the cylinder 65 to move the plunger 66 thereof rearwardly.

Thus is the ejector 62 operated by an actuating means advantageously mounted on the turntable 5, and it will be observed that by reason of the sheaves 71 being mounted for movement with the support frame 13 and the elevating arm 21, longitudinal movement of the beam 9 and scoop 10 is compensated for, and while the ejector actuating means is carried on the turntable horizontal movement of the beam 9 and scoop 10 with respect to the turntable has no effect with respect to altering the position of the ejector 62.

The hydraulic system for controlling the various movements of the hydraulically opearted parts will now be briefly described. The pump 7, driven by the motor 6, serves to effect pressure in the system. The connections from this pump to the cylinders 31, 38, 41 and 65 are effected through platform valves, generally indicated at 81, which are mounted on the turntable forwardly and on the side of the beam structure opposite that on which the pump 7 and motor 6 are disposed. See Figure 1.

These platform valves are manually controlled in a manner unnecessary to be described, and are employed to apply fluid pressure to and release fluid pressure from the lift cylinder 31 for vertically operating the beam 9, to alternately apply fluid pressure to and release fluid pressure from the out cylinders 38 and the in cylinders 41, and to alternately apply fluid pressure to and release fluid pressure from opposite ends of the double acting ejector cylinder 65.

To effect this the following connections are employed. See Figure 18. A high pressure pipe 82 leads from the outlet of the pump 7 to the platform valves and a return pipe 83 leads from the platform valves to a tank 84, mounted on the turntable 5 rearwardly on the same side of the beam structure as the platform valves are disposed, the pump 7 drawing fluid from the tank through a pipe 85.

Figure 18:
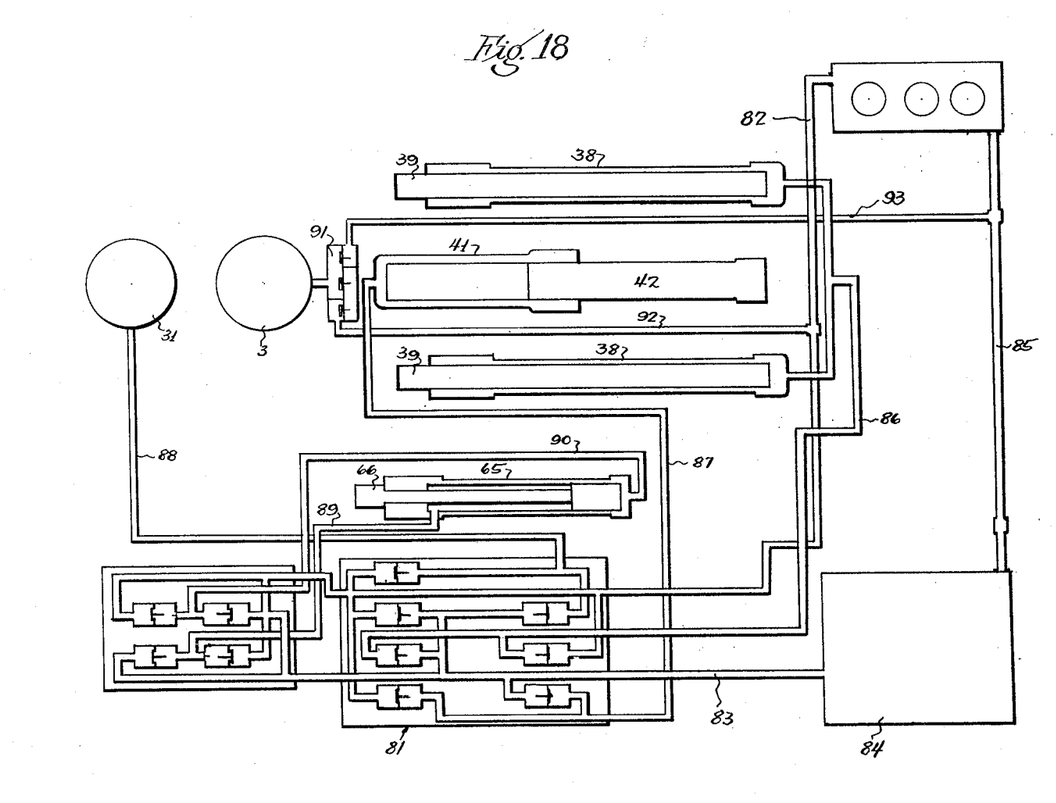
Figure 18 is a diagrammatic view of the fluid pressure system of the machine.

A branched pipe 86 leads from the platform valves to the out cylinders 38, and a pipe 87 leads from the platform valves to the in cylinder 41, and the platform valves are so arranged that when fluid pressure is applied to the out cylinders 38, pressure in the in cylinders 41 is released, and, vice versa, when fluid pressure is applied to the in cylinder, pressure in the out cylinders is released.

A pipe 88 leads from the platform valves to the lift cylinder 31 for applying fluid pressure to and releasing fluid pressure from this cylinder.

A pair of pipes 89 and 90 lead from the platform valves respectively to the front and rear ends of the ejector cylinder 65 for alternating fluid pressure in the ends thereof.

Pressure in the jack cylinder 3 is controlled by manually manipulated jack valves 91 communicating with the jack cylinder and connected with the high pressure pipe 82 by a pipe 92 and with the pipe 85 by a pipe 93.

A pair of inwardly facing internal gear members 95 have the hubs thereof journaled in respective of coaxial bearings 96 on the turntable at respective sides thereof and disposed on a transverse axis adjacent the rear of the turntable 5 and underneath the bearing member 16  See Figures 1, 2, 5, 6 and 8. Keyed in axial bores of these members 95 and extending across between the same is a transmission shaft 97. The right hand member 95 is provided with external spur gear teeth 98 which mesh with a gear 99 keyed to a shaft 100 journaled on brackets 101 at the right hand side of the turntable. A bevel gear 102 is keyed on the shaft 100 and meshes with a second bevel gear 103 secured on the rear end of the shaft of the pump 7 whereby the members 95 and shaft 97 are driven from the motor 6. See Figures 1, 5 and 8. Bored spider members 104 are rotatably mounted on the shaft 97 immediately inward of respective internal gear members 95, and also revolubly mounted on the shaft 97 is a pair of transmission members 105 which are arranged along the shaft 97 and extend from respective of said spider members 104 to the center of the shaft 97.

A second pair of internal gear members 106 are secured on the outer ends of respective transmission members 105 and face outwardly. Spur planetary gears 107 are carried by the spiders 104 and mesh with the internal gear teeth of respective internal gear members 95 and 106, and the spider members 104 are provided with external friction surfaces, designated at 108 in Figure 8, which are engaged by releasable brake bands 109, see Figures 1 and 5, of usual construction and manually controlled in a usual manner, for retarding rotation of respective spider members to provide frictional drives from the outer internal gear members 95 to respective transmission members 105.

Figure 1:
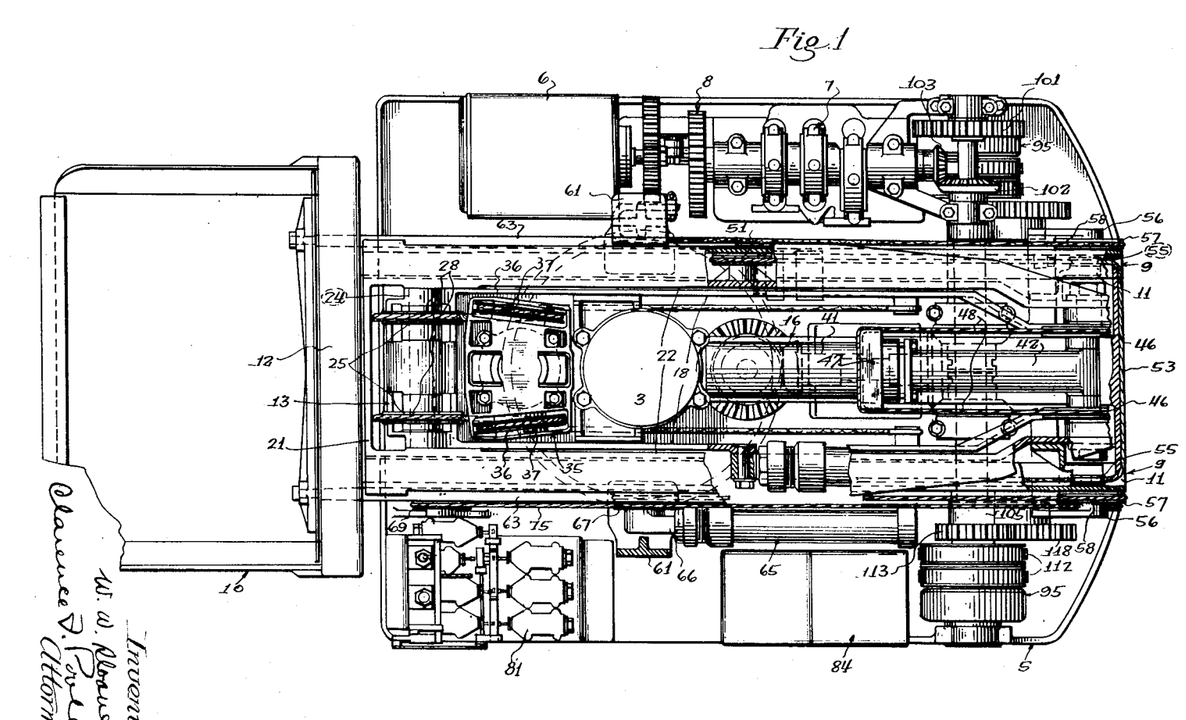
Figure 1 is a top plan view of a power shovel embodying one form of my invention with portions broken away.
Figure 5:
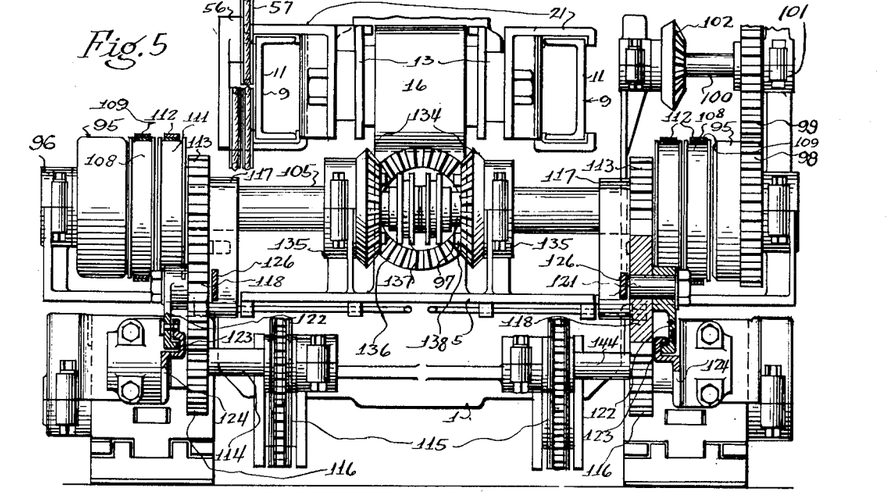
Figure 5 is a partial rear elevation of the machine with parts broken away and in section.
Figure 8:
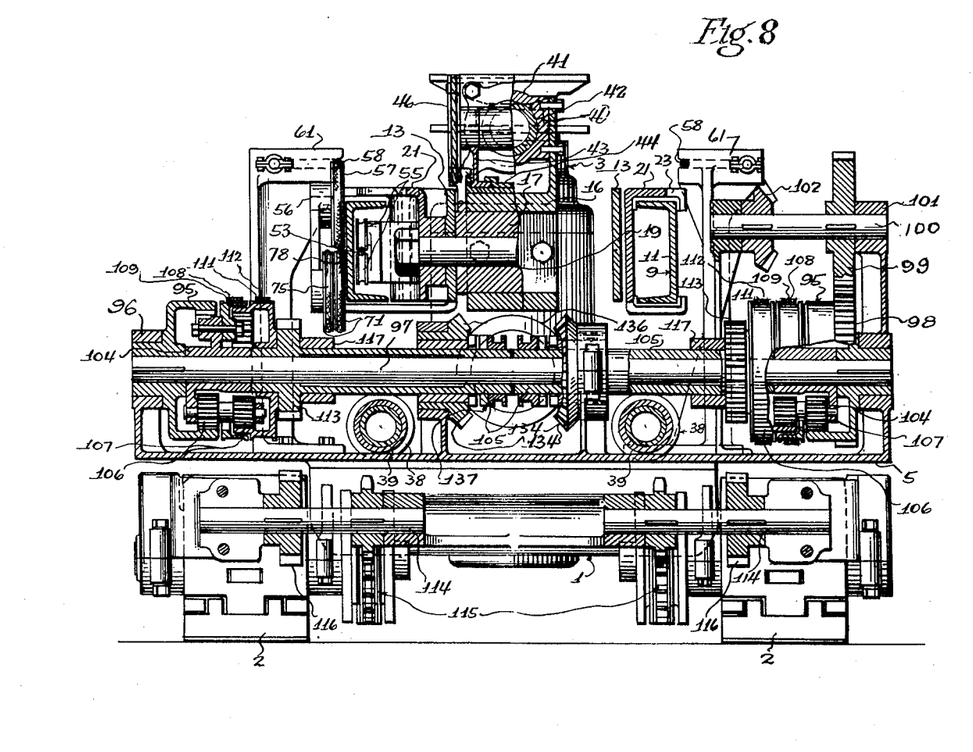
Figure 8 is a partial rear elevation of the machine with parts broken away and in section.
Figure 9:
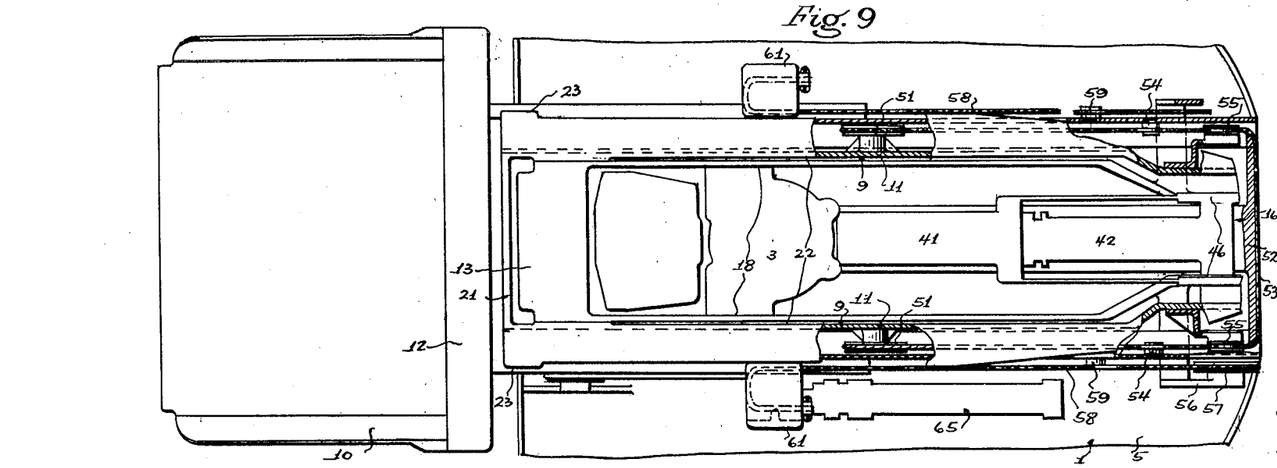
Figure 9 is a partially diagrammatic partial top plan view of the machine with parts omitted, broken away and in section.
Figure 10:
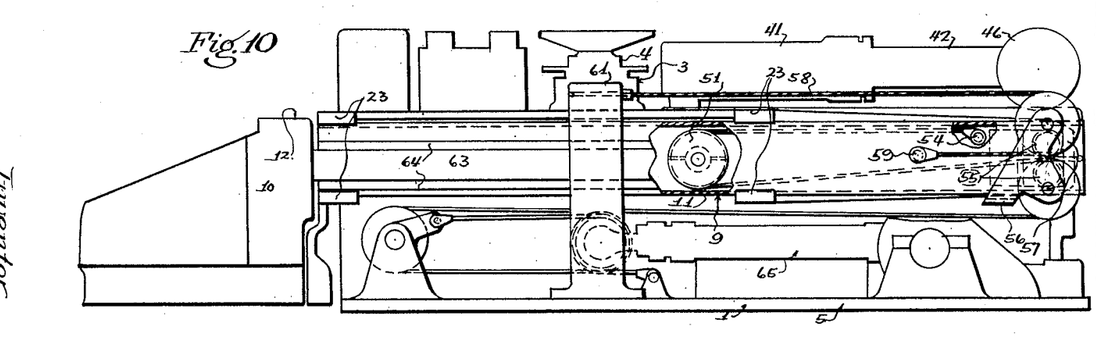
Figure 10 is a partially diagrammatic partial side elevation of the machine with parts omitted, broken away and in section.

The inner internal gear members 106 are provided with external friction surfaces, designated at 111 in Figure 8, which are engaged by releasable brake bands 112, see Figures 1 and 5, of usual construction and manually controlled in a usual manner, for retarding rotation of respective transmission members 105 for purposes hereinafter appearing.

The transmission members 105 are each provided with a spur gear 113 disposed adjacent the respective internal gear members 106. Mounted on the base frame 1 at its rear end and disposed adjacent respective sides thereof is a pair of alined transversely disposed revoluble shafts 114, and these shafts are connected with respective continuous tread devices 2 for driving the same by chain and sprocket devices 115 of usual construction. Spur gears 116 are secured on respective shafts 114 and are disposed to aline with respective gears 113 in one position of the turntable with respect to the base frame as shown in the drawings.

Journaled on the respective transmission members 105 on the inside of respective gears 113 are two arms 117, and rotatably mounted on respective of these arms and meshing with respective gears 113 are two spur gears 118. In the angular movement of the arms 117 the gears 118 clash, engage and disengage with respective gears 116 for driving respective continuous tread mechanisms 2 and for permitting angular movement of the turntable on the base frame.

Figures 6, 7:
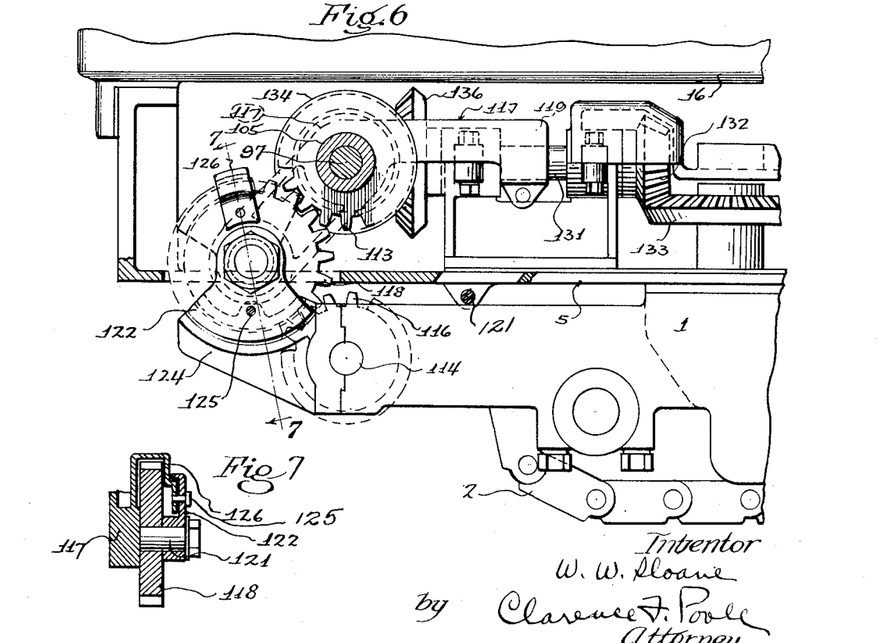
Figure 6 is a partial side elevation of the machine with parts broken away and in section.
Figure 7 is a partial section on the line 7—7 of Figure 6.

The arms 117 are counterbalanced as designated at 119, see Figure 6, for facilitating movement thereof, and are locked in gear disengaged position by usual pin means designated at 121 in said Figure 6. The arms 117 are locked in their gear engaged positions in the following manner. Mounted for angular movement on each arm 117 in coaxial relation with the gear 118 thereof is a member 122 provided with a concentric arcual lip 123 projecting axially therefrom and engageable with a correspondingly recessed formation 124 on the base frame 2 for locking the arm 117 in position with the gear 118 thereof meshed with the respective gear 116 for driving the same. See Figures 5 and 6. Each member 122 is engaged and disengaged with the respective formation 124 by angular movement of the member 122 on its axis, and the members 122 are secured in engagement with respective formations 124 by removable pins 125 engaged in transverse apertures of these members and respective formations 124, see Figures 5 and 6, these pins also serving to lock the members 122 in disengaged position by passing through transverse apertures of the members 122 and extensions 126 of the arms 117.

It will be observed that a drive is provided for the continuous tread devices 2 which is well adapted for its purpose and for a construction involving the beam structure shown, and which permits angular movement of the turntable with respect to the base frame. In operation to propel the shovel the drive bands and the brake bands 109 and 112 are manipulated for steering the shovel in a manner unnecessary to be described.

The turntable 5 is angularly moved on the base frame 1 in the following manner. The base frame is provided with a large internal gear ring 127 secured therewith in concentric relation with the turntable. See Figure 2. Journaled in suitable brackets on the turntable at the rear of the jack is a vertical shaft 128, and secured on the lower end of this shaft is a gear 129 which meshes with the internal gear 127 for driving the turntable on the base frame.

Journaled in suitable brackets on the turntable is a centrally disposed forwardly and rearwardly extending shaft 131. See Figure 2. This shaft extends between the shaft 128 and the shaft 97, and secured on the front end of the shaft 131 is a bevel gear 132 which meshes with another bevel gear 133 secured on the shaft 128 for driving the same.

Revolubly engaged on respective of the aforementioned transmission members 105 adjacent their inner ends is a pair of spaced and bored bevel gears 134 which have their hubs journaled in respective brackets 135 on the turntable. See Figures 2, 5 and 8. These bevel gears 134 face each other and are both meshed with a bevel gear 136 secured on the rear end of the shaft 131 for independently driving the same. Keyed for sliding movement on respective transmission members 105 and disposed between the bevel gears 134 is a pair of positive clutch members 137 which are engageable and disengageable with respective positive clutch formations 138 on the gears 134 for releasably connecting these gears with respective transmission members 105 for driving the same therefrom and through the gear 136 operating the turntable on the base 1 in respective directions.

The clutch members 137 are manually controlled in a usual manner, and when the shovel is being propelled by the continuous tread mechanisms 2 these clutch members are disengaged. When the scoop is to be operated the arms 117 are raised, as hereinbefore described, and the clutch members 137 are engaged with respective clutch formations 138. Thereafter the brake bands 109 are manipulated for frictionally operating the turntable in respective directions.

While I have shown herein and described one form of my invention, I do not wish to be limited to the precise details of construction or arrangements of parts herein shown and described except as specifically limited in the appended claims.

I claim as my invention:

1. In a power shovel, the combination of a frame, a scoop beam, a support member mounted on said frame for bodily movement longitudinally of said beam, elevating means reacting on said support member and carrying said beam for longitudinal movement with respect to said support member, and increasing movement means for effecting said movement of said support member with a greater corresponding longitudinal movement of said beam.

2. In a power shovel, the combination of a frame, a beam, a scoop on the front end of said beam, a support member mounted on said frame for horizontal bodily movement longitudinally of said beam, elevating means mounted on said support member and on which said beam is mounted for longitudinal movement, and means for effecting said movement of said support member in synchronism with and of lesser magnitude than corresponding movement of said beam.

3. In a power shovel, the combination of a frame, a scoop beam, a support member mounted on said frame for movement longitudinally of said beam, an elevating arm pivotally mounted on said support member for vertical movement on a horizontal axis transverse to said beam and upon which said beam is mounted for longitudinal movement, means reacting on said support member for vertically adjusting said elevating arm, and means for effecting said movement of said support member with a greater corresponding longitudinal movement of said beam.

4. In a power shovel, the combination of a turntable frame, a beam, a scoop on the front end of said beam, a support frame mounted on said turntable frame for horizontal movement longitudinally of said beam, an elevating arm pivotally mounted on said support frame at a rearward point thereon for vertical movement on a horizontal axis transverse to said beam and extending forwardly from said axis, said beam being mounted on said elevating arm for longitudinal movement with respect thereto, means reacting forwardly on said support frame for vertically adjusting said elevating arm, and increasing movement means for effecting said movement of said support frame with a greater corresponding longitudinal movement of said beam.

5. In a power shovel, the combination with a vertical holding jack and a frame angularly movable thereabout, of a scoop beam provided with a vertical opening, therethrough extending longitudinally thereof to and open at the rear of the beam, a support frame mounted on said first mentioned frame for horizontal movement longitudinally of said beam and provided with a vertical opening therethrough extending longitudinally of the beam, an elevating arm pivotally mounted on said support frame on a horizontal axis transverse to said beam and on which said beam is mounted for longitudinal movement and provided with a vertical opening therethrough extending longitudinally of the beam, said beam, said support frame and said elevating arm being disposed with the said openings thereof providing clearance for said jack, and means for effecting said movement of said support frame with a greater corresponding longitudinal movement of said beam.

6. In a power shovel, the combination with a vertical holding jack and a frame angularly movable thereabout, of a beam provided with a central vertical opening therethrough extending longitudinally thereof to and open at the rear of the beam, a scoop on the front end of said beam, a horizontal bearing member on said frame at the rear of said jack and extending longitudinally of said beam in central relation therewith, a support frame extending longitudinally of said beam and provided with a central vertical opening therethrough extending longitudinally thereof, means whereby said support frame is carried for longitudinal movement on said first mentioned frame with said opening thereof providing clearance for said jack including a second bearing member engaged with said first mentioned bearing member, an elevating arm pivotally mounted on said frame on a rearwardly disposed horizontal axis transverse to said beam and extending forwardly from said axis and provided with a central vertical opening therethrough extending longitudinally of said beam for clearance of said jack, said beam being mounted for longitudinal movement on said elevating arm, with said opening thereof providing clearance for said jack, and means for effecting said movement of said support frame in synchronism with and of lesser magnitude than corresponding longitudinal movement of said beam.

7. In a power shovel, the combination with a vertical holding jack and a turntable frame angularly movable thereabout, of a beam provided with a central vertical opening therethrough extending longitudinally thereof to and open at the rear end of said beam, an elevated horizontal bearing member on said frame at the rear of said jack and extending longitudinally of said beam in central relation with said jack, a support frame extending longitudinally of said beam and provided with a central vertical opening therethrough extending longitudinally thereof, means whereby said support frame is carried for longitudinal movement on said first mentioned frame with said opening thereof providing clearance for said jack including a second bearing member engaged with said first mentioned bearing member and a horizontal shaft disposed transversely of said beam and engaged in bores of said second bearing member and said support frame on opposite sides of said opening thereof, an elevating arm pivoted on said shaft and extending forwardly therefrom and provided with a central vertical opening therethrough extending longitudinally of said beam for clearance of said jack, said beam being mounted for longitudinal movement on said elevating arm with said opening thereof providing clearance for said jack, and means for effecting said movement of said support frame in synchronism with and of lesser magnitude than corresponding longitudinal movement of said beam.

8. In a power shovel, the combination with a vertical holding jack and a frame angularly movable thereabout, of a scoop beam provided with a vertical opening therethrough extending longitudinally thereof to and open at the rear of the beam, means carrying the beam on said frame with said opening providing clearance for said jack including a support member with respect to which said beam is longitudinally movable and movable in a corresponding direction with respect to said frame and provided with a vertical opening therethrough and extending longitudinally of its movement for clearance of said jack, a relatively short rearwardly acting fluid pressure actuating device disposed at the rear of said jack in central relation therewith, increasing movement means operated by said actuating device for effecting relatively great rearward movement of said support member, a pair of forwardly acting fluid pressure actuating devices disposed on respective sides of said jack for actuating said support member forwardly, and additional increasing movement means for effecting longitudinal movement of said beam in synchronism with and of greater magnitude than corresponding movement of said support member.

9. In a power shovel, the combination with a vertical holding jack and a frame angularly movable thereabout, of a scoop beam provided with a central vertical opening therethrough extending longitudinally thereof to and open at the rear of the beam, a horizontal bearing member on said frame at the rear of said jack and extending longitudinally of said beam in central relation therewith, a support frame extending longitudinally of said beam and provided with a central vertical opening therethrough extending longitudinally thereof, means whereby said support frame is carried for longitudinal movement on said first mentioned frame with said opening providing clearance for said jack including a second bearing member engaged with said first mentioned bearing member, elevating means carrying said beam on said support member for longitudinal movement with respect thereto with said opening of the beam providing clearance for said jack, a relatively short rearwardly acting fluid pressure actuating device disposed at the rear of said jack in central relation therewith, and above said first mentioned bearing member, increasing movement means operated by said actuating device for effecting relatively great rearward movement of said support member, a pair of forwardly acting fluid pressure actuating devices disposed on respective sides of said jack for actuating said support member forwardly, and additional increasing movement means for effecting longitudinal movement of said beam in synchronism with and of greater magnitude than corresponding movement of said support member.

10. In a power shovel, the combination of a frame, a scoop beam, means carrying said beam on said frame including elevating means movable with respect to said frame longitudinally of the beam, actuating means on said frame, and means whereby said actuating means operates said elevating means and adapted to compensate for said movement of said elevating means.

11. In a power shovel, the combination of a turntable frame, a scoop beam, means carrying said beam on said frame including elevating means movable with respect to said frame longitudinally of the beam, a vertically disposed fluid pressure actuating device on said frame, and means whereby said actuating device operates said elevating means and adapted to compensate for said movement of said elevating means.

12. In a power shovel, the combination of a turntable frame, a scoop beam, means carrying said beam on said frame including elevating means movable with respect to said frame longitudinally of the beam and including a support member and an elevating cable having one end secured with said support member, actuating means on said frame, and loop forming means comprising relatively movable bight forming members engaged with said cable and operated by said actuating means for operating the cable for lifting said beam.

13. In a power shovel, the combination of a turntable frame, a scoop beam, means carrying said beam on said frame including elevating means movable with respect to said frame longitudinally of the beam and including a support frame and an elevating cable having one end secured on said support frame, a vertically disposed fluid pressure actuating device on said turntable frame, and loop forming members engaged with said cable and one of which is operated by said actuating means for operating the cable for lifting said beam.

14. In a power shovel the combination of a frame, a scoop, an ejector on said scoop, means carrying said scoop on said frame for operative movement with respect thereto, actuating means on said frame, and means whereby said actuating means operates said ejector and adapted to compensate for said movement of said scoop.

15. In a power shovel, the combination of a frame, a beam, a scoop on said beam, an ejector on said scoop, means carrying said beam on said frame for longitudinal and vertical movement with respect thereto, actuating means on said frame, and means whereby said actuating means operates said ejector and adapted to compensate for said movement of said beam.

16. In a power shovel, the combination of a frame, a beam, a scoop on said beam, an ejector on said scoop, means carrying said beam, on said frame for longitudinal and vertical movement with respect thereto, actuating means on said frame, a cable for actuating said ejector from said actuating means, and means including a bight forming element over which said cable is trained and movable longitudinally of said beam to compensate for longitudinal movement of said beam.

17. In a power shovel, the combination of a frame, a beam, a scoop on said beam, an ejector on said scoop, means carrying said beam on said frame including a supporting member with respect to which said beam is longitudinally movable and movable with respect to said frame in a similar direction, means for effecting movement of said support member in synchronism with and of one half the magnitude of corresponding longitudinal movement of said beam, actuating means on said frame, a cable for actuating said ejector from said actuating means, and a revoluble bight forming element mounted to said support member and over which said cable is trained to compensate for longitudinal movement of said beam.

18. In a power shovel, the combination of a frame, a scoop, an ejector on said scoop, means carrying said scoop on said frame for operative movement with respect thereto, double acting actuating means on said frame, and means whereby said actuating means operates said ejector in both directions and adapted to compensate for said movement of said scoop.

19. In a power shovel, the combination of a turntable frame, a beam, a scoop on said beam, an ejector on said scoop, means carrying said beam on said turntable frame including a supporting frame with respect to which said beam is longitudinally movable and movable with respect to said turntable frame in a similar direction, means for effecting movement of said supporting frame in synchronism with and of one half the magnitude of corresponding longitudinal movement of said beam, a double acting fluid pressure actuating device on said turntable frame, a pair of oppositely acting cables for actuating said ejector from said actuating device in respective directions, and a pair of revoluble bight forming elements mounted on said supporting frame and over respective of which said cables are trained for compensating longitudinal movement of said beam.

Signed at Chicago, in the county of Cook and State of Illinois, this 30th day of June, A. D. 1926.

WILLIAM W. SLOANE.